(12) United States Patent
Lee et al.

(10) Patent No.: US 6,482,011 B1
(45) Date of Patent: Nov. 19, 2002

(54) SYSTEM AND METHOD FOR IMPROVED LEARNING OF FOREIGN LANGUAGES USING INDEXED DATABASE

(75) Inventors: Jae Kyung Lee, Taegu-kwangyoksi (KR); Myoung Hwa Ko, Kyungsangbuk-do (KR); Dae Yeon Kang, Kyungsangbuk-do (KR); Won Uk Yu, Taegu-kwangyoksi (KR); Ik Seung Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/260,092

(22) Filed: Mar. 2, 1999

(30) Foreign Application Priority Data

Apr. 15, 1998 (KR) .............................................. 98 13501
Nov. 14, 1998 (KR) .............................................. 98 48902

(51) Int. Cl.[7] .............................................. G09B 19/06
(52) U.S. Cl. .................................. 434/157; 434/307 R
(58) Field of Search .............................. 434/159, 169, 434/156, 167, 350, 118, 119, 322, 158, 365

(56) References Cited

U.S. PATENT DOCUMENTS

| | | | | |
|---|---|---|---|---|
| 5,120,230 A | * | 6/1992 | Clark et al. ................. | 434/307 |
| 5,393,236 A | * | 2/1995 | Blackmer et al. ........... | 434/169 |
| 5,486,872 A | * | 1/1996 | Moon .......................... | 348/564 |
| 5,727,950 A | * | 3/1998 | Cook et al. .................. | 434/350 |
| 5,810,599 A | * | 9/1998 | Bishop ........................ | 434/157 |
| 5,868,576 A | * | 2/1999 | Maruta ........................ | 434/157 |
| 5,885,083 A | * | 3/1999 | Ferrell ......................... | 434/156 |
| 5,888,071 A | * | 3/1999 | Takamori .................... | 434/156 |
| 6,017,219 A | * | 1/2000 | Adams et al. .............. | 434/178 |
| 6,112,049 A | * | 8/2000 | Sonnenfeld ................. | 434/350 |
| 6,146,147 A | * | 11/2000 | Wasowicz ................... | 434/169 |

* cited by examiner

Primary Examiner—Joe H. Cheng
Assistant Examiner—Kathleen M. Christman
(74) Attorney, Agent, or Firm—Fleshner & Kim, LLP

(57) ABSTRACT

Disclosed is a learning data base building method which can achieve data update in an optimum memory size and simultaneously build a systematic data configuration. Moreover, a video apparatus having a learning function and learning function control method therefor which can provide systematic, simple and effective learning by using a learning data base. The learning data base building method includes the steps of arranging vocabulary data in order of frequency in use thereof, grouping the arranged vocabulary data classified by subjects, and producing index for reading in consecutive order the groups of the vocabulary data classified by subjects.

26 Claims, 10 Drawing Sheets

FIG.1

| |
|---|
| Conversation in English data |
| Origin vocabulary data |
| Higher vocabulary data |
| High vocabulary data |
| Middle vocabulary data |
| Elementary vocabulary data |
| Index table |
| Conversation in English start index, the number of data |
| Origin vocabulary data start index, the number of vocabulary |
| Higher vocabulary data start index, the number of vocabulary |
| High vocabulary data start index, the number of vocabulary |
| Middle vocabulary data start index, the number of vocabulary |
| Elementary vocabulary data start index, the number of vocabulary |

FIG.2

| Order | Learning level | Vocabulary | Phonetic symbol | Interpretation | Synonym Number | Vocabulary origin number | data end |
|---|---|---|---|---|---|---|---|
| 00205, | high, | cheer, | tʃiər, | 격려,,,FFFF, | | | |
| 00206, | high, | cheer up, | | 기운내다,,,FFFF, | | | |
| . | | | | | | | |
| . | | | | | | | |
| 00213, | high, | stream, | stri:m, | 유출하다, | 00102/00304/00313,,FFFF, | | |
| 00222, | high, | figure out,, | | 이해하다/계산하다,,,FFFF, | | | |

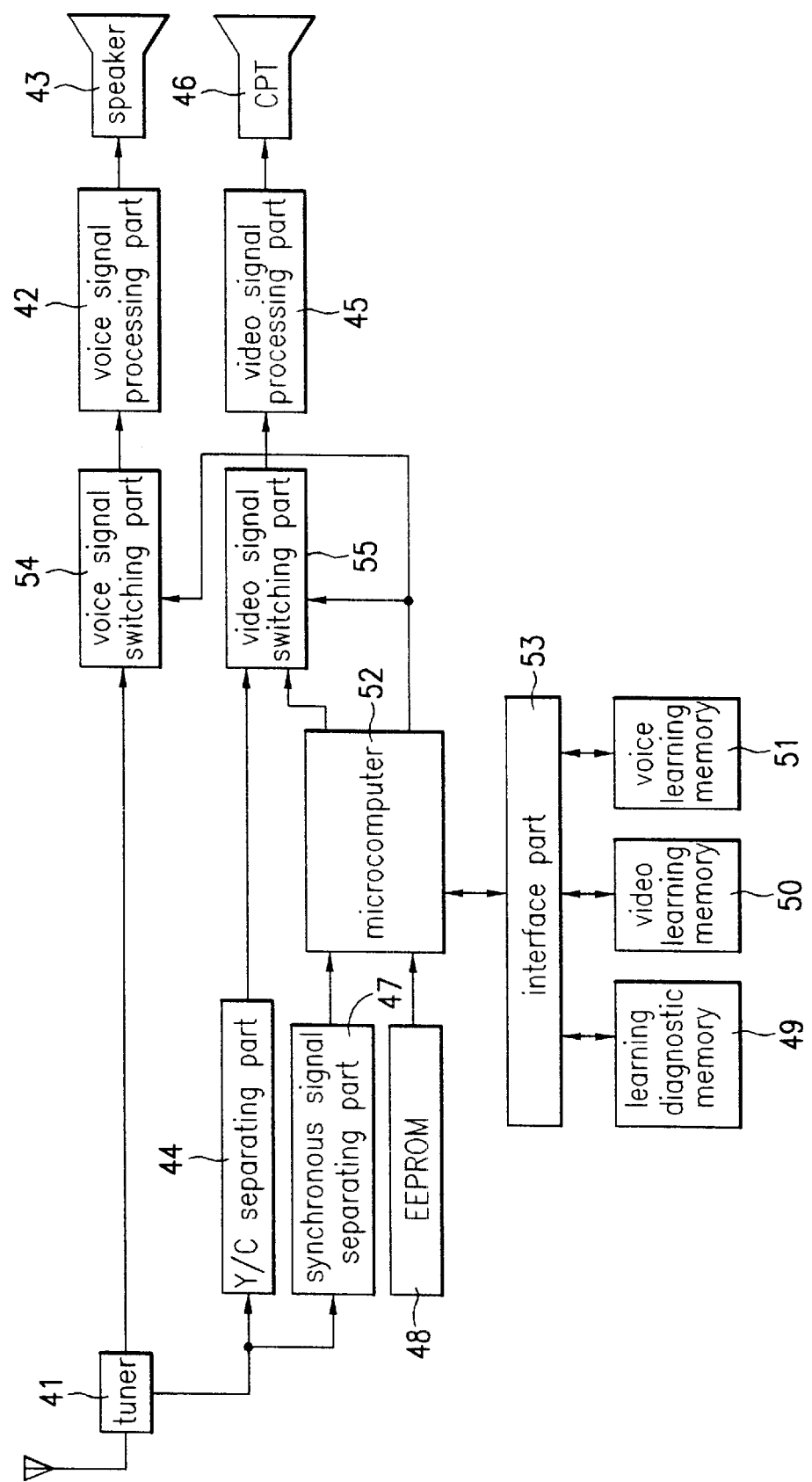

FIG.6

| user | learning level | start NO. | the number of repetition | period | start |
|------|----------------|-----------|--------------------------|--------|-------|
| A | elementary level | 001 | continuous | 60 seconds | cancel |
| B | middle level | 1201 | 10 | 60 seconds | start |
| C | high level | 03001 | 5 | 50 seconds | cancel |
| D | higher level | 10001 | 20 | 60 seconds | cancel |
| E | origin of vocabulary | 15801 | 5 | 40 seconds | cancel | move: ◀▶  select: ▲▼  end: ■

FIG.7

| time | user | start |
|------|------|-------|
| AM7 ～ AM8 | A | start |
| PM5 ～ PM6 | B | start |
| PM7 ～ PM8 | C | cancel |
| PM9 ～ PM11 | D | start |
| PM11 ～ PM12 | E | start | move: ◀▶  select: ▲▼  end: ■

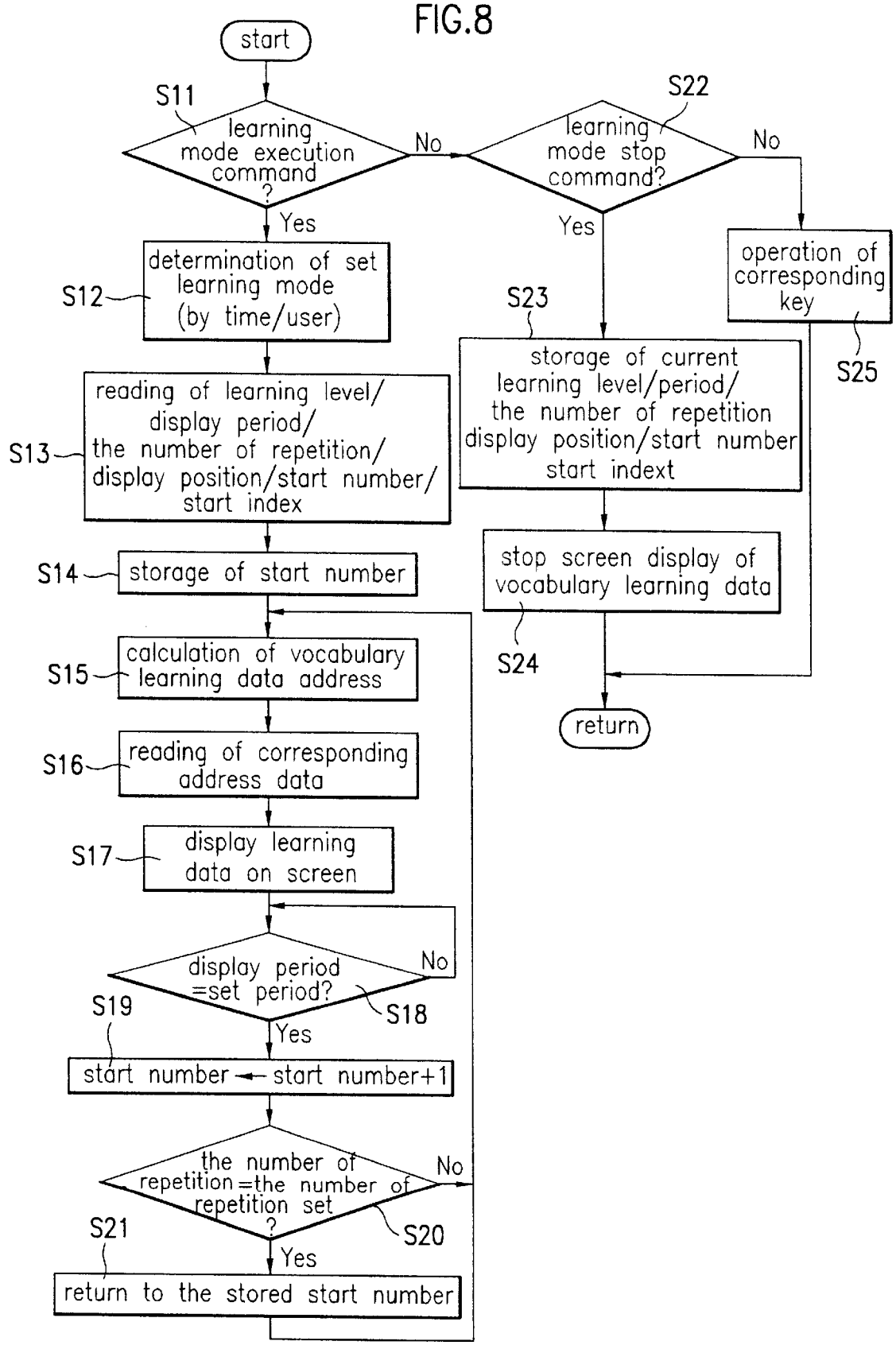

| forecast | 예측하다 |
| postpone | 연기하다 |
| pen | 펜/우리 |
| district | 지역/지구 |
| custom | 관습 |
| sponsor | 보증인 |

SYSTEM AND METHOD FOR IMPROVED LEARNING OF FOREIGN LANGUAGES USING INDEXED DATABASE

BACKGROUND OF THE INVENTION

1. Field of the Invention

The present invention relates to a learning data base building method in which a learning data base is built by assigning index by classification to learning vocabulary data to be thereby inputted/outputted in an easy manner. Moreover, the present invention relates to a video apparatus having a learning function by using the learning data base and learning function control method therefor.

2. Discussion of Related Art

Recently, various kinds of vocabulary learning systems using a personal computer, electronic pocketbook and the like are introduced, through which a foreign language such as English, Japanese language and so on may be learned. In these systems, if the vocabulary corresponding to a desired English vocabulary is inputted by a user, the desired vocabulary is displayed with the explanation thereof or a conversation in English classified by simple subjects is displayed. Within the data base which is applied in the system, however, only basic vocabulary in order of alphabet or simple conversation expression by subjects is stored.

Moreover, with the development of multimedia environment, learning desire to know foreign languages by using all kinds of multimedia is increased drastically. To satisfy the learning desire excited by the user, an improved systematic learning system which can be applied to multimedia should be developed.

A television is a multimedia apparatus, to which a broadcasting program is loaded through a series of signal processing steps to a viewer. As known, the television is prevalent in most all homes. Television programming provides various kinds of information to users, regardless of age or class, including life information, game shows, news, sports programs and so on. Also, the television broadcast format is effective at capturing the attention of viewers.

Since the desire of the user for the function enlargement of television is increased in response to the rapid development of multimedia environment, there is a need to develop a multifunctional type television with various kinds of additional functions such as, for example, a learning function-embedded television.

Conventional learning systems have provided, however, basic level of learning step not to achieve an excellent learning efficiency. Moreover, the conventional learning systems have failed to suggest a systematic data base which executes a learning function through a rapidly developed multimedia. Accordingly, there is a need to propose a novel learning data base building method and a video apparatus using the learning data base, thus to accomplish a systematic and simple data base building and an effective learning effect.

SUMMARY OF THE INVENTION

Accordingly, the present invention is directed to a learning data base building method and a video apparatus having a learning function by using the learning data base and learning function control method therefor that substantially obviate one or more of the problems due to limitations and disadvantages of the related arts.

An object of the invention is to provide a learning data base building method which can achieve data update in an optimum memory size and simultaneously build a systematic data configuration.

Another object of the invention is to provide a video apparatus having a learning function and learning function control method therefor which can provide a systematic, simple and effective learning tool by using a learning data base.

According to a first embodiment of the present invention, there is provided a video apparatus having a learning function including: a learning data base in which vocabulary learning data and vocabulary learning data reading index are stored; a caption processing part for processing video data to be displayed on a screen in a caption form; a control part for reading the vocabulary learning data corresponding to contents set by a user, if a learning function demand is made by the user and for controlling the caption processing part to display the vocabulary learning data on the screen in the caption form; a switching part for inputting an output signal from the caption processing part and a video apparatus control on screen display (hereinafter, referred to as OSD) signal, respectively, to selectively output the inputted signals in accordance with the switching signal of the control part; and a video processing part for inputting an output signal of the switching part and a broadcasting video signal, respectively and for performing a video signal processing for the inputted signals to be displayed on the screen.

According to a second embodiment of the present invention, there is provided a video apparatus having a learning function including: a learning data base in which vocabulary learning data and vocabulary learning data reading index are stored; a learning diagnostic memory in which test problems classified by learning levels for recognizing the rate of learning progress corresponding to a user are stored; a font ROM in which fonts for display the vocabulary learning data and the test problems classified by learning levels on the screen are stored; and a control part for reading the corresponding data in the learning data base or the learning diagnostic memory, if a learning function demand or a learning diagnostic function demand is made by the user and for matching the corresponding fonts from the font ROM to perform an OSD signal processing and output the processed signal.

According to a third embodiment of the present invention, there is provided a video apparatus having a learning function including: a first memory in which vocabulary learning data and vocabulary learning data reading index are stored; a second memory in which test problems classified by learning levels for recognizing the rate of learning progress corresponding to a user are stored; a third memory in which voice learning data corresponding to video learning data is stored; an interface part for inputting/outputting the data stored in the first to third memories to correspond with a learning related command issued by the user which is inputted by means of a remote controller or a key panel; a microcomputer for controlling the data input/output operation of the interface part and converting the data outputted from the interface part into an OSD form to thereby output the converted data; a video processing part for video-processing a broadcasting video signal and the converted data in the OSD form to be displayed on the screen; a voice signal switching part for selectively outputting the voice learning data or a broadcasting voice signal outputted from the third memory by means of the interface part under the control of the microcomputer; and a voice signal processing part for voice-processing the output of the voice signal switching part.

In the preferred embodiment of the present invention, a learning function control method in a video apparatus having a learning function comprises the steps of: determining whether a learning mode set command or a learning mode execution command is inputted by a user; if the learning mode set command is inputted, displaying a learning mode set screen and setting a learning mode classified by users or time by the user; and if the learning mode execution command is inputted, reading learning data corresponding to a preset learning mode from a learning data storing part and performing a video signal process for the learning data read to thereby display the processed signal in a predetermined display form on a screen.

In the preferred embodiment of the present invention, a learning data base building method comprises the steps of: arranging vocabulary data in order of frequency in use thereof; grouping the arranged vocabulary data classified by subjects; and producing index for reading in consecutive order the groups of the vocabulary data classified by subjects.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings.

In the drawings:

FIG. 1 illustrates an exemplary configuration of a learning data base according to the present invention;

FIG. 2 illustrates an example of data arrangement of the learning data base according to the present invention;

FIG. 5 is a block diagram illustrating a video apparatus having a learning function according to a third embodiment of the present invention;

FIG. 6 illustrates an example of a learning mode set screen classified by users according to the present invention;

FIG. 7 illustrates an example of a learning mode set screen classified by time according to the present invention;

FIG. 8 is a flowchart illustrating a learning mode execution method of the video apparatus according to the present invention;

DETAILED DESCRIPTION OF PREFERRED EMBODIMENT

Figure 3:
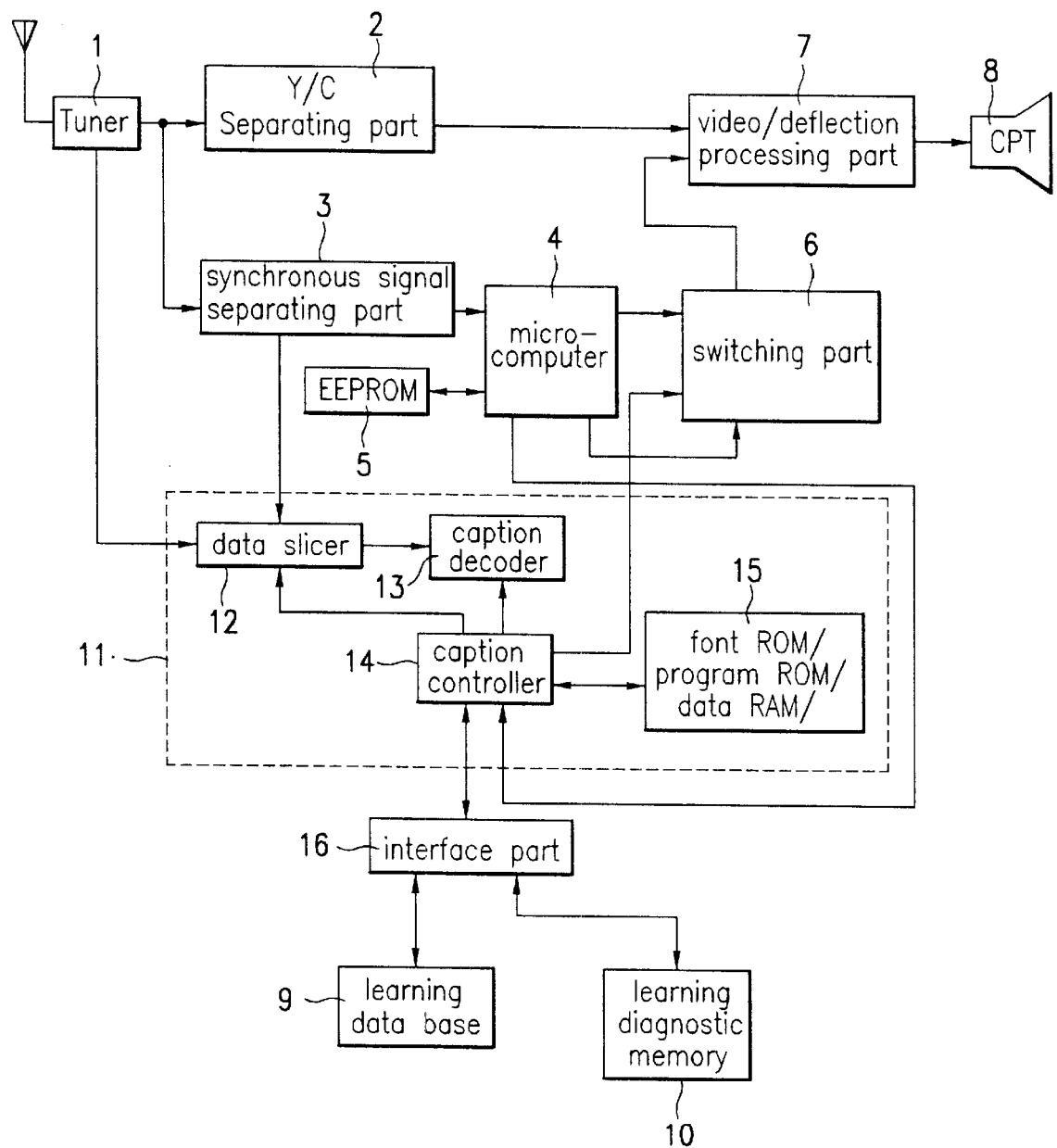
FIG. 3 is a block diagram illustrating a video apparatus having a learning function according to a first embodiment of the present invention.

Reference will now be made in detail to the preferred embodiments of the present invention, examples of which are illustrated in the accompanying drawings.

Hereinafter, an explanation of a learning data base building method according to the present invention will be discussed with reference the accompanying drawings.

FIG. 1 illustrates an exemplary configuration of a learning data base according to the present invention. As shown, the learning data base configuration is formed by conversation in English, vocabulary for the origin thereof, higher/high/middle/elementary vocabulary, index table, start index for each data.

As shown in FIG. 2, arrangement format of each data is determined in the form of priority, learning level, vocabulary, phonetic symbol, interpretation, synonym No., origin of vocabulary No., data end. Each of them is defined by a first delimiter ','.

For instance, in case of a higher vocabulary 'cheer' in 205th order, since the synonym and the origin of the vocabulary do not all exist, the first delimiter is added two times on the corresponding sections. On the other hand, in case of a higher vocabulary 'stream' in 213th order, since three synonyms to the vocabulary exist, a second delimiter '/' is added three times on the corresponding section. The first and second delimiters serve to prevent data recognized by the user from being confused.

The priority of data arrangement is determined by sorting the data in accordance with the frequency in use of the data, dividing the data into a plurality of learning levels such as, for example, higher/high/middle/elementary levels, and grouping the divided data by subjects (e.g. seasons/countries/time) within each learning level.

Since the lengths of data corresponding to each vocabulary differ in the case where the data arrangement as mentioned above is made, the index table is provided to solve the problem that each vocabulary is not searched in an easy manner and further to improve the flexibility of memory.

By way of example, in the case where the lengths of continuous data are '15' and '20', respectively, the index table is given in order of '2000', '2015', and '2035', in which an index of the corresponding vocabulary is read to thereby search the start point thereof.

Next, the start index, which is provided to facilitate an easy system setting, upon data base replacement or data update, indicates the information on the start point of vocabulary data by each learning level and the total number of data. Therefore, the data base replacement or the system setting can be achieved only by reading the start index, without an additional setting operation.

Additionally, to readily search the vocabulary data by subjects in the case where the vocabulary data is classified by subjects, an index by subjects is developed to designate an address of data by subjects.

An explanation of the construction and operation of a television as a video apparatus having a learning function by using the above-discussed learning data base according to first to third embodiments of the present invention will be in detail discussed with reference to FIGS. 3 to 5.

First Embodiment

As shown in FIG. 3, a television as a video apparatus having a learning function according to a first embodiment of the present invention includes: a tuner 1 for selecting a broadcasting signal received through an antenna; an Y/C separating part 2 for separating the broadcasting signal inputted from the tuner 1 into Y, U, and V signals, respectively; a synchronous signal separating part 3 for separating a synchronous signal in the broadcasting signal inputted from the tuner 1; a microcomputer 4 for inputting the synchronous signal separated in the synchronous signal separating part 3 and for outputting an OSD or caption data to be synchronous with the synchronous signal; an electrically erasable and programmable ROM (EEPROM) 5; a switching part 6 for selectively outputting the OSD or caption data in accordance with a control signal of the microcomputer 4; a video/deflection processing part 7 for performing a video and deflection process for the output signals from the Y/C separating part 2 and the switching part 6; a color picture tube (CPT) 8; a learning data base 9 in which vocabulary data classified by learning levels, index table and start index are stored; a learning diagnostic memory 10 in which test problems classified by learning levels for checking the rate of learning progress are stored; a caption processing part 11 for caption-processing caption data contained in the broadcasting signal through the tuner 1 and the data read in the learning data base 9 and the learning diagnostic memory 10; and an interface part 16 for performing data exchange between the caption processing part 11 and the learning data base 9.

Preferably, the caption processing unit 11 is comprised of: a data slicer 12 for extracting the caption data from the broadcasting signal through the tuner 1 in accordance with the synchronous signal outputted from the synchronous signal separating part 3; a caption decoder 13 for decoding the caption data; a caption controller 14 for controlling process of the caption data; and font ROM/program ROM/data RAM 15 in which fonts and a font processing program for English and Korean language are respectively stored.

In operation, if the power is turned 'on', firstly, the start index of the learning data base 9 is uploaded to the microcomputer 4, to thereby implement system setting.

At this time, if a user inputs a learning mode execution command, the microcomputer 4 recognizes an address of data corresponding to learning mode set contents of the user by using the index table and the start index of the learning data base 9 and applies the control signal to the caption controller 14 to read the corresponding data from the learning data base 9.

Meanwhile, if the user inputs a learning diagnostic mode execution command, the microcomputer 4 applies the control signal to the caption controller 14 to read the learning progress checking test problem data from the learning diagnostic memory 10.

Then, the caption controller 14 reads the data through the interface part 16 and matches the fonts corresponding to the data from the font ROM/program ROM/data RAM 15, to thereby output the matched output result to the switching part 6.

Next, the microcomputer 4 applies the control signal to the switching part 6 to thereby output the corresponding data to the video/deflection processing part 7, which is finally displayed in the caption form on the CPT 8.

Second Embodiment

Figure 4:
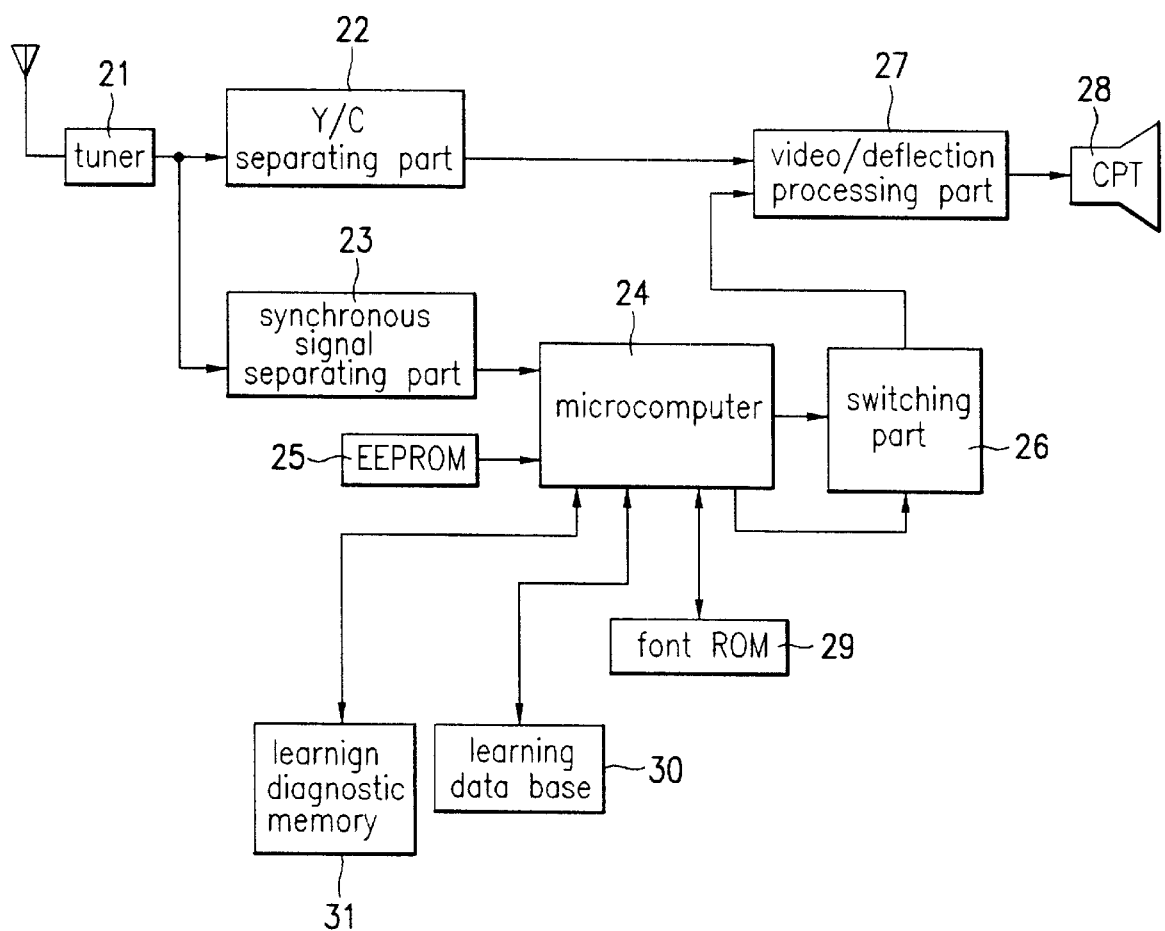
FIG. 4 is a block diagram illustrating a video apparatus having a learning function according to a second embodiment of the present invention.

As shown in FIG. 4, a television as a video apparatus having a learning function according to a second embodiment of the present invention includes: a tuner 21 for selecting a broadcasting signal received through an antenna; an Y/C separating part 22 for separating the broadcasting signal inputted from the tuner 21 into Y, U, and V signals, respectively; a synchronous signal separating part 23 for separating a synchronous signal in the broadcasting signal inputted from the tuner 21; a microcomputer 24 for inputting the synchronous signal separated in the synchronous signal separating part 23 and for outputting an OSD or caption data to be synchronous with the synchronous signal; an electrically erasable and programmable ROM (EEPROM) 25; a switching part 26 for selectively outputting the OSD or caption data in accordance with a control signal of the microcomputer 24; a video/deflection processing part 27 for performing a video and deflection process for the output signals from the Y/C separating part 22 and the switching part 26; a color picture tube (CPT) 28; a font ROM 29 in which fonts for OSD-processing English and Korean language are stored; a learning data base 30 in which vocabulary data classified by learning levels, index table and start index are stored; and a learning diagnostic memory 31 in which test problems classified by learning levels for checking the rate of learning progress are stored.

In operation, if the power is turned 'on', firstly, the start index of the learning data base 30 is uploaded to the microcomputer 24, to thereby implement system setting.

At this time, if a user inputs a learning mode execution command, the microcomputer 24 recognizes an address of data corresponding to learning mode set contents of the user by using the index table and the start index of the learning data base 30 and reads the corresponding data from the learning data base 30.

Meanwhile, if the user inputs a learning diagnostic mode execution command, the microcomputer 24 reads the learning progress checking test problem data from the learning diagnostic memory 31.

Then, the microcomputer 24 matches the fonts corresponding to the data from the learning data base 30 or the learning diagnostic memory 31 and outputs the matched output result to the video/deflection processing part 27 via the switching part 26. The vocabulary learning data, which has been inputted through the video/deflection processing part 27, is finally displayed in the OSD form on the CPT 28.

Third Embodiment

As shown in FIG. 5, a television as a video apparatus having a learning function according to a third embodiment of the present invention includes: a tuner 41 for selecting broadcasting voice and video signals received through an antenna; a voice signal processing part 42 for processing the broadcasting voice signal through the tuner 41 to be thereby outputted to a speaker 43; an Y/C separating part 44 for separating the broadcasting video signal inputted from the tuner 41 into Y, U, and V signals, respectively; a video/deflection processing part 45 for performing video and deflection processes; a color picture tube (CPT) 46; a synchronous signal separating part 47 for separating a synchronous signal in the broadcasting signal inputted from the tuner 41; an electrically erasable and programmable ROM (EEPROM) 48; a learning diagnostic memory 49 in which test problems classified by learning levels for checking the rate of learning progress are stored; a video learning memory 50 in which video learning data in the learning data is stored; a voice learning memory 51 in which voice learning data corresponding to the video learning data stored in the video learning memory 50 is stored; a microcomputer 52 for OSD-processing the data read from the learning diagnostic memory 49 and the video learning memory 50 and for being synchronous with the synchronous signal separated in the synchronous signal separating part 47; an interface part 53 for performing input/output operation for the data from the learning diagnostic memory 49, the video learning memory 50, the voice learning memory 51, and the microcomputer 52; a voice signal switching part 54 for selectively outputting the voice learning data read from the voice learning memory 51 and the broadcasting voice signal in accordance with the control signal of the microcomputer 52; and a video signal switching part 55 for selectively outputting the OSD-processed learning data and the broadcasting video signal in accordance with the control signal of the microcomputer 52.

In operation, if a user inputs a learning mode execution command, the microcomputer 52 recognizes an address of data corresponding to learning mode set contents of the user by using the index table and the start index of the video learning memory 50. Then, the microcomputer 52 reads the corresponding data from the video learning memory 50 through the interface part 53 and reads the voice learning data corresponding to the video learning data from the voice learning memory 51.

Meanwhile, if the user inputs a learning diagnostic mode execution command, the microcomputer 52 reads the learning progress checking test problem data from the learning diagnostic memory 49.

Then, the microcomputer 52 performs the OSD process for the data read from the learning diagnostic memory 49 or the video learning memory 50 to thereby output the OSD-processed signal to the video signal switching part 55. Next, the output of the video signal switching part 55 is processed in the video signal processing part 45 under the control of the microcomputer 52.

Simultaneously, the microcomputer 52 outputs the voice learning data read from the voice learning memory 51 to the voice signal switching part 54. Next, the output of the voice signal switching part 51 is processed in the voice signal processing part 42 under the control of the microcomputer 52.

The video learning data from the video signal processing part 45 is finally displayed in the OSD form on the CPT 46, and the voice signal from the voice signal processing part 42 is synchronous to the video learning data, thus to be finally outputted through the speaker 43.

A learning function control method in the video apparatus having the learning function according to the preferred embodiments of the present invention is embodied in accordance with the learning mode set by the user. In more detail, every when the user presses a learning mode set key which is provided on the body of the video apparatus or a remote controller, a learning mode set screen by users as shown in FIG. 6 and a learning mode set screen by time as shown in FIG. 7 are in turn displayed.

Firstly, the learning mode set screen by users as shown in FIG. 6 includes a user item, a learning level item for selecting the learning level adequate to the corresponding user, a start number item for setting a detailed level in the selected learning level (for example, in case of the vocabulary number 1 to 500 at the level 'A', the vocabulary number 500 corresponds to a high detailed learning level), the number of repetition item for selecting the number of vocabulary to be repeatedly displayed, a period item for selecting the time of period when vocabulary is displayed, and a start item for setting start/cancel.

Therefore, manipulation of keys '▲▼' allows the user or the details of each item to be set, and manipulation of keys '◄,►' allows the corresponding user to be moved a desired item. If the learning mode set is completed, the learning mode setting operation is finished by using the key '■'.

In addition, a display position of the vocabulary learning data according to the learning mode setting of the user, i.e. the top or bottom portion of the screen can be selected by using the remote controller or a hot key arranged on the body. Simultaneously, the desired item to be displayed on the screen by the user in the data arrangement items (vocabulary/phonetic symbol/interpretation/synonym/origin) as mentioned in FIG. 2 can be selected by using the remote controller or the hot key arranged on the body of the video apparatus.

Next, the learning mode by time as shown in FIG. 7 includes time, user and start/cancel detail items. In this case, if the user by desired time is set, the detail item of the corresponding user set in the learning mode by users is applied to the corresponding time period.

In other words, using the fact that viewing classes differ in accordance with the broadcasting program by time on television, the learning data which is adequate to the level of the viewing class on the corresponding time can be displayed to conform with the detail item set in the learning mode by users according to start and cancel. The detail item setting operation in the learning mode by time is the same as the learning mode by the users.

A desired learning mode by the user in the learning mode by users and the learning mode by time can be selected.

Under the state where the desired learning mode is set, an explanation of a method for controlling the learning mode execution will be given with reference to FIG. 8. In this case, the method is applied to the video apparatus having the learning function in accordance with the first embodiment of the present invention.

Firstly, if the power of the television is turned 'on', the microcomputer 4 uploads the start index from the learning data base 9 and stores the start index in the EEPROM 5, to thereby perform the system setting.

At step S11, it is determined whether the learning mode execution command is inputted, and if inputted, at step S12 it is determined whether the learning mode by time or the learning mode by users is selected.

Next, the contents set through the learning mode setting function, i.e. learning level of the corresponding user, period, the number of repetition, display position, start number and the start index uploaded from the learning data base 9 are read by the user, at step S13.

The start number is stored at step S14, and an address on which the learning data desired by the user exists is calculated by using the start index and the start number, at step S15.

At this time, since the start point of the corresponding learning level is recognized through the start index, the start index is added to the start number set by the user. As a result, the added value is calculated as the address on which the learning data exists.

Next, at step S16 the microcomputer 4 applies the address control signal to the caption controller 14 and reads the corresponding learning data from the learning data base 9.

The caption controller 14 matches the corresponding learning data and the font from the font ROM/program ROM/data RAM 15, to thereby output the matched output result to the switching part 6.

Figure 9:
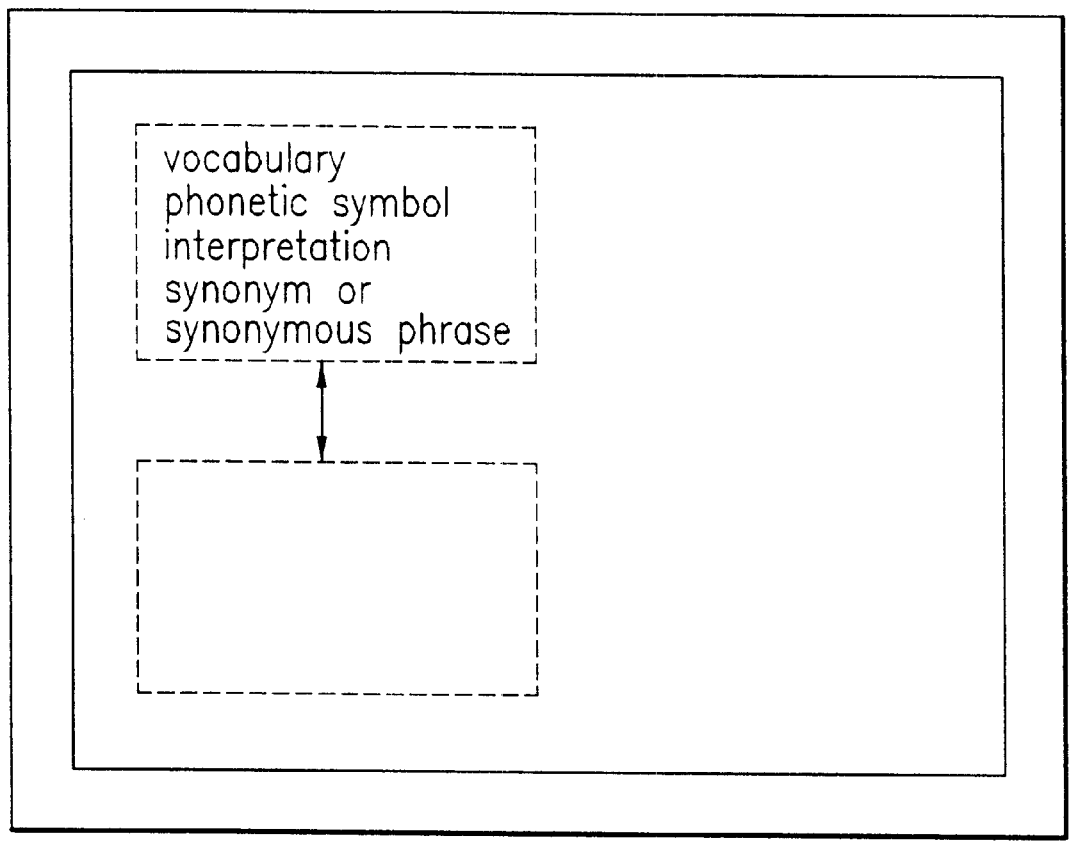
FIG. 9 illustrates an example of a learning mode execution screen according to the present invention.

Then, the microcomputer 4 applies the control signal to the switching part 6 to thereby output the corresponding learning data to the video/deflection processing part 7, which is finally displayed as shown in FIG. 9 on the CPT 8, at step S17.

At this time, vocabulary, phonetic symbol, interpretation, and synonym or synonymous phrase are selectively displayed in accordance with the demand of the user.

The display position of the vocabulary learning data is changed to the top or bottom portion of the screen in accordance with the selection of the user. At this time, in the case where the OSD or caption data such as volume adjustment, channel adjustment and so on is displayed on the screen in accordance with the key input of the user, the OSD or caption data should be displayed prior to the vocabulary learning data.

For example, when the screen top portion OSD is turned 'on', even if the user sets the display position of the vocabulary learning data on the top portion of screen, the vocabulary learning data is displayed on the bottom portion of the screen. Contrarily, when the screen bottom portion OSD is turned 'on', even if the user sets the display position of the vocabulary learning data on the bottom portion of screen, the vocabulary learning data is displayed on the top portion of the screen.

At step S18, the microcomputer 4 determines whether the display period is the same as set by the user, and if same, increases the start number by '1' at step S19. Next, the microcomputer 4 determines whether the number of repetition is the same as set by the user, at step S20. If not same, the stored start number is updated at the step S14, and the start index is added to the updated start number to thereby calculate the address on which next vocabulary learning data exists. The steps S15 to S20 are repeated until the number of repetition is the same as set by the user, to thereby display the next vocabulary learning data.

If same at the step S20, the microcomputer 4 returns to the start number initially set by the user at step S21 and repeatedly performs the above display operation.

At this time, in the case where the number of repetition is set as 'continuous', the start number is continually increased to display in a sequential order initial to last vocabulary of the corresponding learning level. If the last vocabulary is displayed, the microcomputer 4 returns to the initial step.

On the other hand, if the learning mode stop command is inputted at step S22, the current learning level/period/the number of repetition/display position/start number/start index are stored at step S23 to thereby stop the display of the vocabulary learning data at step S24.

In addition to the learning data display according to the learning mode, a learning diagnostic mode and a learning review mode are provided for the purpose of checking the learning progress of the user and enhancing the learning desire of the user, by the help of a learning diagnostic key and a review key.

Figure 10:
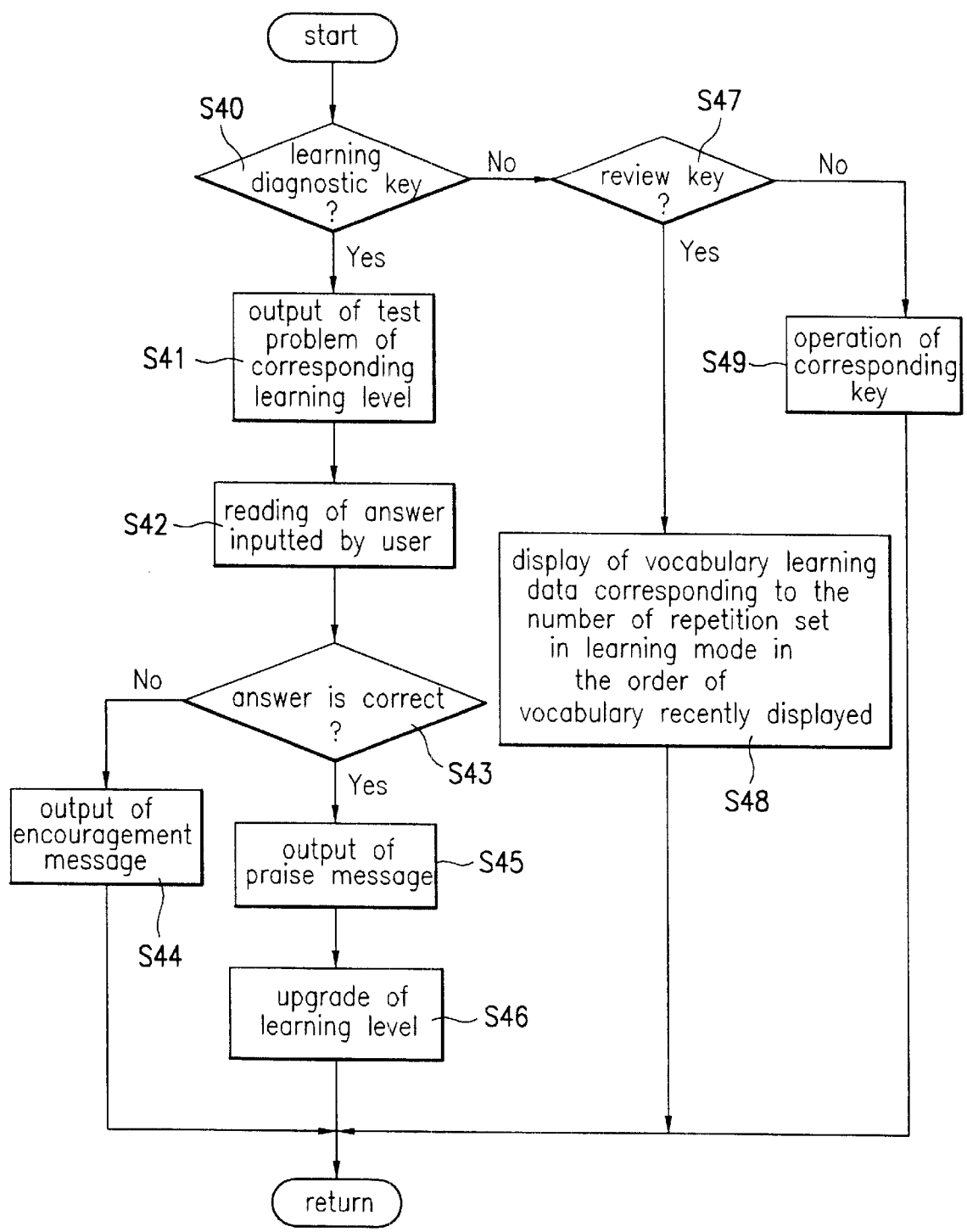
FIG. 10 is a flowchart illustrating a method of executing a learning diagnostic mode and a review mode in the video apparatus having a learning function according to the present invention.

FIG. 10 is a flowchart illustrating a method of executing a learning diagnostic mode and a review mode in the video apparatus having the learning function according to the present invention.

As shown, the microcomputer 4 determines whether the learning diagnostic key signal is inputted at step S40.

Under the state where the learning diagnostic key signal has inputted, if the current learning level or the learning level set in the learning mode is at the elementary level, the microcomputer 4 reads the English test problem corresponding to the elementary level from the learning diagnostic memory 10 and displays the read problem on the screen at step S41.

At this time, the user presses the left/right key to thereby select the corresponding blank and the top/bottom key to thereby input the corresponding English word.

The microcomputer 4 reads the answer inputted by the user at step S42 and determines whether the answer is correct at step S43.

If not correct, the microcomputer 4 outputs an encouragement message indicative of "do your best a little more", at step S44.

If correct, the microcomputer 4 outputs a praise message indicative of "well done", at step S45.

At this time, there is an advantage in that all of the viewers who watch the program on the television, e.g. members of a family praise the user who receives the praise message.

Moreover, from the fact that the answer inputted by the user is correct, it can be expected that the learning level of the user is improved, such that the learning level can be upgraded from the elementary grade to the middle grade, at step S46.

Figures 11, 12:
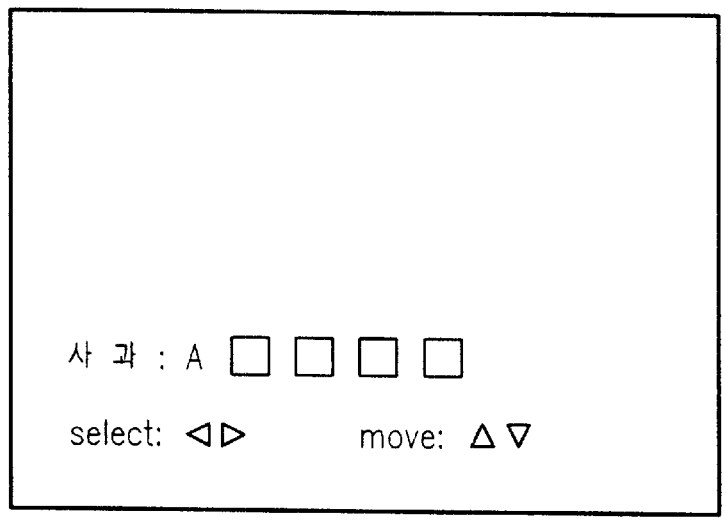
FIG. 11 illustrates an example of a learning diagnostic mode execution screen of FIG. 10.
FIG. 12 illustrates an example of a learning review mode execution screen of FIG. 10.

In the meanwhile, the microcomputer 4 determines whether the review key is inputted at step S47, and if inputted, recognizes the vocabulary learning data address corresponding to the number of repetition set by the user in the recent displayed vocabulary learning data. Next, the microcomputer 4 reads the vocabulary learning data of the corresponding address from the learning data base 9 and displays the data simultaneously on the screen, as shown in FIG. 12, at step S48.

At this time, in the case where a plurality of vocabulary learning data are all displayed with the display items of vocabulary/phonetic symbol/interpretation/synonym or synonymous phrase, as shown in FIG. 9, the vocabulary learning data as many as the number of repetition set by the user can not be displayed, so that the display items of the vocabulary learning data in the review mode are reduced to the vocabulary and meaning thereof items.

As discussed above, the learning function control method according to the present invention is applied in the video apparatus having the learning function according to the first embodiment of the present invention, but may be applied to the video apparatus according to the second and third embodiments of the present invention. In this case, there exists a difference of the display form between the first to third embodiments of the present invention, but the method for controlling the main learning function such as the learning mode set and execution, and learning diagnostic and review mode execution is the same as each other. Therefore, an explanation of them will be avoided for the brevity of description.

Hereinafter, advantages which can be achieved from the preferred embodiments of the present invention are as follows:

Firstly, since a learning data base building method in which the start point classified by each learning level and the start index indicative of the number of vocabulary are contained is embodied, system setting procedure is made in an easy manner upon the replacement or update of data base.

Secondly, since a learning data base building method in which data is classified by the frequency in use thereof, subjects and learning levels is embodied, a memory can be utilized effectively and thereby a systematic and effective learning effect can be expected.

Thirdly, since a learning function control method in which one or more user can select the desired learning level, the number of repetition, period or time is embodied, the learning concentration and desire of the user can be improved.

Finally, since a learning function control method in which the learning diagnostic mode and the review mode are contained is embodied, with the simple manipulation of key, the recently displayed vocabulary can be reviewed, from which the learning level can be checked to improve the learning efficiency.

In the meanwhile, a television as the video apparatus having a learning function in accordance with first to third embodiments of the present invention is only a part of the video apparatuss to which the principles of the present invention is applied. Therefore, if the learning data base, the learning diagnostic memory and the learning function control algorithm are applied to all of video apparatuss, there exist differences in a signal processing method and a display form in accordance with characteristics of the video apparatuss, but it is irrespective of the embodiment of the present invention, such that it can be appreciated that the present invention can be widely applied to all kinds of video apparatuss.

It will be apparent to those skilled in the art that various modifications and variations can be made in a learning data base building method and a video apparatus having a learning function by using the learning data base and learning function control method therefor of the present invention without departing from the spirit or scope of the invention. Thus, it is intended that the present invention cover the modifications and variations of this invention provided they come within the scope of the appended claims and their equivalents.

What is claimed is:

1. A video apparatus having a learning function, comprising:
    a learning data base in which vocabulary learning data and vocabulary learning data reading index are stored, wherein vocabulary learning data is organized by level of difficulty, subject and frequency of use;
    a caption processing part for processing video data to be displayed on a screen in a caption form;
    a control part for reading the vocabulary learning data corresponding to contents set by a user, if a learning function demand is made by the user, and for controlling said caption processing part to display the vocabulary learning data on the screen in the caption form;
    a switching part for inputting an output signal from said caption processing part and a video apparatus control on screen display signal, respectively and for selectively outputting the inputted signals in accordance with the switching signal of said control part; and
    a video processing part for inputting an output signal of said switching part and a broadcasting video signal, respectively and for performing a video signal processing for the inputted signals to be displayed on the screen, wherein the video apparatus includes means for displaying the vocabulary learning data according to a predetermined number of display repetitions, and for a predetermined display period.

2. The video apparatus of claim 1, further comprising an interface part for performing data exchange between said learning data base and said caption processing part.

3. The video apparatus of claim 1, further comprising a learning diagnostic memory in which test problems classified by learning levels for recognizing the rate of learning progress corresponding to a user are stored.

4. A video apparatus having a learning function, comprising:
    a learning data base in which vocabulary learning data and vocabulary learning data reading index are stored, wherein the vocabulary learning data is organized by level of difficulty, subject, and frequency of use;
    a learning diagnostic memory in which test problems classified by learning levels for recognizing the rate of learning progress corresponding to a user are stored;
    a font ROM in which fonts for display the vocabulary learning data and the test problems classified by learning levels on a screen are stored; and
    a control part for reading the corresponding data in said learning data base or said learning diagnostic memory, if a learning function demand or a learning diagnostic function demand is made by the user and for matching the corresponding fonts from said font ROM to perform an on screen display signal processing, thus to output the processed signal.

5. The video apparatus of claim 4, further comprising a switching part for inputting the vocabulary learning data in the on screen display form, respectively to selectively output the input signals in accordance with the switching signal of said control part, and a video signal processing part for inputting an output signal of said switching part and a broadcasting video signal, respectively and for performing a video signal processing for the inputted signals to be displayed on the screen.

6. The apparatus of claim 4, wherein the vocabulary data classified by subject to the frequency of use, and wherein the ordered vocabulary data is classified by subject.

7. The apparatus of claim 6, wherein the vocabulary data classified by subject is indexed according to levels of difficulty, and wherein a start index indicates a start position for each of the levels of difficulty.

8. A video apparatus having a learning function, comprising:
    a first memory in which vocabulary learning data and vocabulary learning data reading index are stored, wherein the vocabulary learning data is organized to have a user-selectable start position according to levels of difficulty, and within each of said levels of difficulty an indexed position indicates frequency of use and subject;
    a second memory in which test problems classified by learning levels for recognizing the rate of learning progress corresponding to a user are stored;
    a third memory in which voice learning data corresponding to video learning data is stored;
    an interface part for configured to input and output the data stored in said first to third memories to correspond with a learning related command issued by the user which is inputted by means of a remote controller or a key panel;
    a microcomputer configured to control said interface part and convert the data outputted from said interface part into an on screen display form to thereby output the converted data;
    a video processing part that video-processes a broadcasting video signal and the converted data in the on screen display form;
    a voice signal switching part configured to selectively output the voice learning data or a broadcasting voice signal outputted from said third memory by said interface part under the control of said microcomputer; and
    a voice signal processing part configured to process the output of said voice signal switching part.

9. The apparatus of claim 8, wherein a start index indicates said start position by the user, and wherein said start index is indicative of a number of vocabulary in said level of difficulty.

10. The apparatus of claim 8, wherein the video apparatus includes means for displaying the vocabulary learning data according to a predetermined number of display repetitions, and for a predetermined display period.

11. A learning function control method in a video apparatus having a learning function, said method comprising:

determining whether a learning mode set command or a learning mode execution command is inputted by a user;

if said learning mode set command is inputted, displaying a learning mode set screen and setting a learning mode by the user, wherein setting the learning mode includes selecting a level of difficulty, a number of display repetitions, and a display period; and if said learning mode execution command is inputted, reading learning data corresponding to a preset learning mode from a learning data storing part, performing a video signal process for the data read, and displaying the processed signal in a predetermined display form on a screen, wherein the learning data is organized by level of difficulty, subject and frequency of use.

12. The method of claim 11, wherein setting the learning mode further comprises selecting the learning data to be displayed at the selected level of difficulty.

13. The method of claim 11, wherein setting the learning mode includes setting learning mode user and execution start/cancel items.

14. The method of claim 13, wherein the learning mode user and execution start/cancel items set in the learning mode by users as the learning mode are applied to the learning mode.

15. The method of claim 11, wherein the predetermined display form comprises a predetermined vocabulary and meaning thereof.

16. The method of claim 11, wherein in said displaying step of the learning data on the screen a display item of the learning data is comprised of vocabulary/phonetic symbol/interpretation/synonym number/origin of the vocabulary.

17. The method of claim 11, wherein the predetermined display form includes a predetermined number of display items selected by the user.

18. The method of claim 11, wherein the predetermined display form comprises a first language and a second language.

19. The method of claim 11, wherein the predetermined display form includes a designation for display on a top or bottom portion of the screen in accordance with a user selection.

20. The method of claim 11, further comprising simultaneously displaying recently displayed learning data and a corresponding number of display repetitions in accordance with the selection of the user.

21. The method of claim 20, wherein recently displayed learning data comprises vocabulary and meaning thereof.

22. The method of claim 11, further comprising displaying vocabulary test problems corresponding to a current learning level in accordance with the selection of the user and determining whether an answer inputted through a remote controller or a key panel on the body of the video apparatus is correct to thereby check the rate of learning progress of the user in a learning diagnostic mode.

23. The method of claim 22, wherein said displaying step in the learning diagnostic mode comprises: displaying a praise message on the screen, if the answer inputted by the user is correct; and displaying an encouragement message on the screen, if the answer inputted by a the user is not correct.

24. The method of claim 23, wherein said encouragement message displaying step in the learning diagnostic mode comprises the step of upgrading the learning level set in the learning mode by time or users.

25. A learning control method of a video apparatus having a learning function, said method comprising the steps of:

(a) determining whether a learning function execution command is inputted;

(b) if inputted, determining a current learning position and reading learning data corresponding to the current learning position from a learning data storing part;

(c) displaying during a predetermined time period the learning data read on a screen and reading learning data corresponding to next learning position; and repeating said step (c) until a learning function stop command is inputted.

26. The method of claim 25, wherein said learning position is a start position classified by learning levels previously set or a previous learning completion position of a user.

* * * * *